United States Patent
Stickle (10) Patent No.: US 10,440,132 B2
(45) Date of Patent: Oct. 8, 2019

(54) TRACKING APPLICATION USAGE IN A COMPUTING ENVIRONMENT

(71) Applicant: Amazon Technologies, Inc., Reno, NV (US)

(72) Inventor: Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 270 days.

(21) Appl. No.: 13/792,399

(22) Filed: Mar. 11, 2013

(65) Prior Publication Data

US 2014/0258506 A1 Sep. 11, 2014

(51) Int. Cl.
| | | |
|---|---|---|
| G06F 15/173 | (2006.01) | |
| H04L 29/08 | (2006.01) | |
| G06F 11/30 | (2006.01) | |
| G06F 21/62 | (2013.01) | |
| G06F 11/34 | (2006.01) | |

(52) U.S. Cl.
CPC .......... *H04L 67/22* (2013.01); *G06F 11/3003* (2013.01); *G06F 21/6218* (2013.01); *G06F 11/3051* (2013.01); *G06F 11/3466* (2013.01); *G06F 2201/815* (2013.01); *G06F 2201/865* (2013.01)

(58) Field of Classification Search
CPC ....... H04L 47/70; H04L 43/065; H04L 67/22; G06F 11/3003; G06F 21/6218
See application file for complete search history.

(56) References Cited

U.S. PATENT DOCUMENTS

| | | | |
|---|---|---|---|
| 5,949,415 A | 9/1999 | Lin et al. | |
| 7,925,635 B1 * | 4/2011 | Ravulur et al. | 707/688 |
| 8,160,247 B2 * | 4/2012 | Agrawal et al. | 380/44 |
| 2007/0043860 A1 * | 2/2007 | Pabari | 709/224 |
| 2007/0261030 A1 | 11/2007 | Wadhwa | |
| 2009/0276771 A1 * | 11/2009 | Nickolov et al. | 717/177 |
| 2010/0125657 A1 | 5/2010 | Dowling et al. | |
| 2011/0173525 A1 | 7/2011 | Mukhopadhyay et al. | |
| 2012/0011394 A1 * | 1/2012 | Maki | G06F 11/2028 714/6.3 |

(Continued)

FOREIGN PATENT DOCUMENTS

| | | |
|---|---|---|
| EP | 1246069 | 10/2002 |
| JP | 2006134136 A | 5/2006 |

(Continued)

OTHER PUBLICATIONS

Search Report for PCT/US2014/022678 dated Jul. 30, 2014.
(Continued)

*Primary Examiner* — Glenton B Burgess
*Assistant Examiner* — Rachel J Hackenberg
(74) *Attorney, Agent, or Firm* — Thomas | Horstemeyer, LLP (57) ABSTRACT

Disclosed are various embodiments for reporting as well as tracking usage and/or installation of an application in a machine instance in a computing environment. A machine instance can execute an application and can be associated with a storage volume on which the application is installed. The application, or an installer utility associated with the application, can report installation and/or usage of the application to an application usage service.

23 Claims, 7 Drawing Sheets

(56) References Cited

U.S. PATENT DOCUMENTS

2013/0268655 A1* 10/2013 Luna et al. ............... 709/224
2013/0339284 A1* 12/2013 Rowles ............. G06Q 30/02
                                                                706/46
2014/0082201 A1*  3/2014 Shankari et al. ......... 709/226

FOREIGN PATENT DOCUMENTS

| JP | 2008500628 A | 1/2008 |
| WO | 2009111799 | 9/2009 |
| WO | 2012040241 A1 | 3/2012 |

OTHER PUBLICATIONS

Please note that WO2009111799 has been split into 3 parts due to size.
Canadian Office Action dated Jul. 27, 2016 for Application No. PCT/US2014/022678.
Translation of Chinese Office Action dated Dec. 5, 2017 (Application No. 201480014140.2).
Chinese office Action dated Sep. 27, 2018 (Application No. 201480014140.2).
English Translation of Chinese Office Action dated Sep. 27, 2018 (Application No. 201480014140.2).

* cited by examiner

TRACKING APPLICATION USAGE IN A COMPUTING ENVIRONMENT

BACKGROUND

Computing environments in which users may create instances of virtual computing devices or virtual machines are increasingly employed to perform various computing tasks. These instances are also known as machine instances in a computing environment. Storage volumes can also be created in a computing environment to operate as mass storage for use with machine instances. For examples, machines instances and applications executed by the machine instances that require a database, file system or other mass storage can be linked with such a storage volume, which can be archived and restored. Tracking usage of applications for licensing purposes can be difficult in a computing environment as machine instances and storage volumes are created and destroyed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Virtual machines in network accessible computing environments are increasingly employed by users who desire computing resources on an on-demand basis. For example, a web site may employ virtual machines, or machine instances, that are provided by a computing environment as servers that generate and serve content to clients. In this sense, a machine instance is a virtual computing environment that can be configured with varying processing power, graphics capabilities, memory resources, etc. As another example of a scenario in which a machine instance can be utilized, a social networking service may employ machine instances on an on-demand basis from a computing environment to provide the functionality of the social networking service. In either case, machine instances can be created and provided by the computing environment on an as-needed basis, e.g., when traffic spikes occur.

As another example, machine instances in a computing environment can be employed by a user to perform calculations or computations on a large scale when the user may not possess large scale computing systems sufficient for a desired task. As yet another example, a machine instance in a computing environment can be employed as a database server through which a relational or non-relational database can be accessed. In either scenario, a user can request a machine instance with processing power, memory resources, and other computing resources that are appropriate for a given task that the user is trying to accomplish. Other examples or use-cases of machine instances in a computing environment should be appreciated.

In connection with machine instances in a computing environment, storage volumes of varying sizes are employed for mass storage purposes. A storage volume can accompany a machine instance when the machine instance is created. In other words, a local storage volume can be created as a part of the machine instance when the machine instance is created. Such a local storage volume does not survive termination of its associated machine instance. Accordingly, a local storage volume may be appropriate where persistence of data is not a requirement of the use of the machine instance that is imposed by the user. For example, a user may configure the machine instance to archive data generated by the machine instance in a data store that is external to the computing environment or in a persistent storage service provided by the computing environment.

In other scenarios, a storage volume that survives termination of a machine instance may be desired. Therefore, the computing environment, in some embodiments, can offer persistent storage volumes on an on-demand basis of varying sizes, speeds, data durability, and other attributes, that survive termination and/or failure of a particular machine instance. Accordingly, such storage volumes can be requested by a user, associated with a machine instance and used as a persistent mass storage device that is accessible to the machine instance. Such a storage volume can be archived in the computing environment and reused by a subsequent machine instance that is created on behalf of a user.

For example, a machine instance can be associated with a storage volume, and then applications and other software can be installed and configured on the storage volume for use by the machine instance. In a computing environment in which machine instances may be created and/or terminated in rapid fashion or on an on-demand basis, tracking application usage for software licensing or billing purposes can be a challenge for independent software vendors who provide software as a service in a computing environment, where the software is executed on machine instances. Tracking application usage can also be a challenge for other types of software vendors who may sell or license software that is used in such a computing environment on machine instances that employ storage volumes that are also provided by the computing environment. In the following discussion, a general description of the system and its components is provided, followed by a discussion of the operation of the same.

Figure 1:
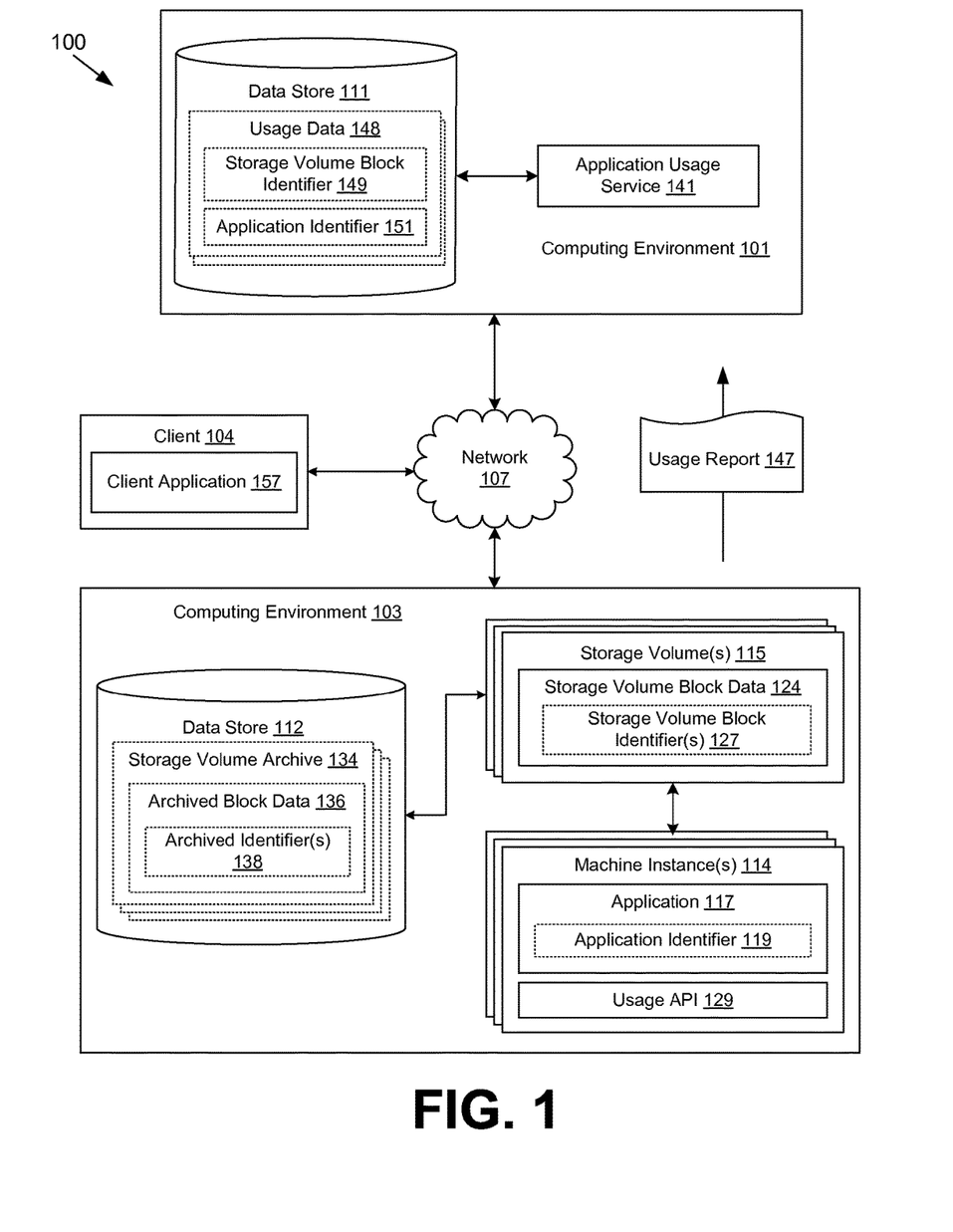
FIG. 1 is a drawing of a networked environment according to various embodiments of the present disclosure.

With reference to FIG. 1, shown is a networked environment 100 according to various embodiments. The networked environment 100 includes a computing environment 101, computing environment 103 and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 and computing environment 103 may each comprise, for example, a server computer or any other system providing computing capability. Alternatively, the computing environment 101 and/or computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 101 and/or computing environment 103 may include a plurality of computing devices that together may comprise a cloud computing resource, a grid computing resource, and/or any other distributed computing arrangement. In some cases, the computing environment 101 and/or computing environment 103 may correspond to an elastic computing resource where the allotted capacity of processing, network, storage, or other computing-related resources may vary over time.

In the non-limiting example of a networked environment 100 of FIG. 1, the computing environment 103 represents an environment in which users can request computing resources, such as machine instances, storage volumes, storage services, and/or other computing resources. Either computing environment can represent a plurality of computing devices that are geographically disparate for purposes of load balancing, failover, and/or fault tolerance. For example, either computing environment may comprise clusters of computing devices that are positioned in various data centers across various geographic regions, various server racks within data centers in the various regions, and various networks.

Various applications and/or other functionality may be executed in the computing environment 101 and computing environment 103 according to various embodiments. Also, various data is stored in a data store 111 that is accessible to the computing environment 101. Various data is also stored on a data store 112 that is accessible to the computing environment 103 to facilitate providing computing resources and/or services that are requested by users. The data store 111 and data store 112 may be representative of a plurality of data stores as can be appreciated. The data stored in the data store 111 and data store 112, for example, are associated with the operation of the various applications and/or functional entities described below that are executed or provided by the respective computing environments 101, 103.

The components executed on the computing environment 103, for example, include one or more machine instances 114, and/or storage volumes 115. Additionally, other applications, services, processes, systems, engines, or functionality not discussed in detail herein may also be executed in the computing environment 103. As noted above, the computing environment 103 represents an environment that provides computing resources such as machine instances 114, storage volumes 115 and other computing resources or services on an on-demand or as-needed basis. In some scenarios, users may reserve or set computing resources aside within the computing environment 103 on an exclusive basis.

A machine instance 114 represents a virtual machine or a quantum of computing resources that a user may employ to perform various computing tasks. The machine instance 114 can represent one or more computing devices that execute one or more operating systems, user applications, services, etc. In other words, a machine instance 114 comprises a virtualized instance of an operating system to facilitate the execution applications 117, services, or other functionality. Each machine instance 114 can also communicate with a virtualization layer, which controls access to a hardware layer by each of the executed machine instances 114 in the computing environment 103. Such a virtualization layer may further comprise a privileged domain. The privileged domain may comprise a machine instance 114 with distinct or higher-level user privileges with respect to the other executed machine instances 114 in order to facilitate interactions between machine instances 114, a hardware layer, or other components. The privileged domain may also comprise access restrictions, limiting operation of the privileged domain to an authorized subset of users such as a system administrator. The privileged domain may facilitate the creation and management of machine instances.

A hardware layer, as referenced above, comprises various hardware components that facilitate the operation of machine instances 114 and their associated executed functionality. The hardware layer may comprise network interface cards, network routing components, processors, memories, storage devices, or other components that, together, provide the requested computing capabilities that a user desires to include within a particular requested machine instance 114. For example, a machine instance 114 requiring a certain level of processing speed, input/output operations capacity and other performance attributes can be implemented with multiple computing devices through such a hardware layer that presents the underlying computing resources of the computing devices as a single hardware device to the virtualization layer.

As noted above, in some scenarios, a machine instance 114 can be configured with a local storage volume for mass storage purposes. For example, applications executed by and data used by the machine instance 114 can be stored on such a local storage volume. In other scenarios, a storage volume 115 can be requested by or established by the computing environment 103 that is separate from the machine instance 114. In other words, a storage volume 115 can be created that is associated with a machine instance 114 and that survives termination of a respective machine instance 114 with which it is associated. Accordingly, it should be appreciated that the scenario shown in FIG. 1 that includes a storage volume 115 that is external to respective machines instances 114 are only one example of a configuration in which embodiments of the disclosure can be implemented.

Therefore, in the depicted example of FIG. 1, a machine instance 114 is configured to execute one or more applications 117. An application 117 can represent software that is sold or licensed by independent software vendors or other entities for use within a machine instance 114 in the computing environment 103. In other words, the application 117 can represent software that is installed on a storage volume 115 and used in the machine instance 114. Accordingly, various copies or installations of an application 117 can have an application identifier 119.

An application identifier 119 can represent an identifier that uniquely identifies a copy of an application 117 with respect to other copies of the application 117. In other words, the application identifier 119 can represent a product code or any other type of identifier that a software vendor may employ to uniquely identify an application 117. It should be appreciated that in some scenarios, such as in a bulk or multi-user licensing scenario, multiple copies of an application 117 can be configured with the same application identifier 119. In such a scenario, a software vendor may wish to track usage of the application 117 within the computing environment 103 to determine whether the usage complies with the terms of a bulk licensing or multi-user licensing agreement. An application 117 can comprise any software, logic, service, or other functionality executed within a machine instance 114 of the computing environment 103. Examples of an application 117 may include web applications, web services, server applications, or other functionality.

A storage volume 115 represents a mass storage resource that is accessible to a machine instance 114. In some embodiments, the storage volume 115 represents a network accessible storage volume and provides a file system or a block level storage volume for use with a machine instance 114 in the computing environment 103. The storage volume 115 comprises storage volume block data 124, which represents storage blocks within the storage volume 115 for use by the operating system of a machine instance 114 or by an application 117 executed by a corresponding machine instance. For example, a machine instance 114 can be created and associated with a storage volume 115 for the mass storage needs of the machine instance 114, such as application storage, data storage, cache file storage, operating system usage, or any other use as can be appreciated.

The storage volume 115 is also configured with one or more storage volume block identifiers 127, which represent an identifier that is written to or associated with actual storage blocks in the storage volume 115. In some embodiments, a storage volume 115 can be configured with a storage volume identifier that uniquely identifies a storage volume 115 with respect to other storage volumes 115 in the computing environment 103. In other embodiments, the storage volume block identifier 127 can uniquely identify one or more storage blocks within storage volume block data 124 and within a storage volume 115 with respect to other storage blocks in other storage volumes 115 in the computing environment 115. The storage volume 115 is also configured to provide the storage volume block identifier 127 or such a storage volume identifier upon request to its corresponding machine instance 114 upon request. In some embodiments, the storage volume block identifier 127, whether it uniquely identifies one or more storage blocks within a storage volume 115 or uniquely identifies a storage volume 115 with respect to other storage volumes 115, can be stored on one or more storage blocks within the storage volume 115 to which it is associated.

A machine instance 114 can also be configured with a usage application programming interface (API) 129, which comprises a software library through which usage of an application 117 can be reported, as will be described in further detail below. The usage API 129 is configured to obtain the application identifier 119 for a given application 117 as well as a storage volume block identifier 127 or storage volume identifier on which the application 117 is installed on behalf of a machine instance 114, and report both identifiers to a service that tracks usage of the application 117. The usage API 129 can also be configured to obtain an identifier associated with a machine instance 114 that is executing the application 117 as well as any other metadata that is associated with the environment in which the application 117 is installed and configured for the purposes of tracking usage. The data obtained by the usage API 129 can be reported to track usage of the application 117.

The usage API 129 can be implemented as a software library that is accessible via one or more API calls to an application 117 executed by the machine instance 114 or as a standalone process that is executed by the machine instance 114. In some embodiments, the usage API 129 can represent a standalone service that is implemented as a network accessible service that is accessed via a web service call by the application 117. As noted above, the operation of the usage API 129 and a service that tracks usage of an application 117 is described in further detail below.

The data store 112 of the computing environment 103 represents one or more mass storage systems or devices in which data can be archived. The data store 112 can represent multiple computing devices that are located in various geographic locations and in various data centers for data storage and data durability. In the context of the instant disclosure, the data stored in the data store 112 includes, for example, storage volume archives 134 that correspond to storage volumes 115. Each of the storage volume archives 134 includes archived block data 136, which represents the storage volume block data 124 corresponding to a particular storage volume 115. Each of the storage volume archives 134 also includes one or more archived identifiers 138 that correspond to the storage volume block identifiers 127 and/or storage volume identifiers associated with the storage volume 115.

In this way, a storage volume 115 can be archived upon termination of a corresponding machine instance 114, but the storage volume block identifier 127 as well as the storage volume block data 124 corresponding to the storage volume 115 can be restored into a new storage volume 115 that is created by the computing environment 103 if requested by a user or a machine instance 114. However, should the contents of a storage volume 115 be copied onto a newly created second storage volume 115, the second storage volume 115 would have a different storage volume block identifier 127.

The components executed on the computing environment 101, for example, include an application usage service 141. Additionally, other applications, services, processes, systems, engines, or functionality not discussed in detail herein may also be executed in the computing environment 101. The application usage service 141 is executed to track usage of applications 117 within the computing environment 103.

The usage API 129 generates a usage report 147 that includes at least an application identifier 119 as well as a storage volume block identifier 127 associated with the storage volume 115 on which the application 117 is installed. The usage report 147 can include other information or metadata, such as an identifier associated with the machine instance 114 executing the application 117, an identifier associated with a software vendor, geographic information associated with the machine or cluster of machines in which the machine instance 114 and/or storage volume 115 are executed, or other information. The usage API 129 can be called on to generate a usage report 147 when the application 117 is installed by an installer utility associated with the application 117.

The usage report 147 can also be generated by the usage API 129 when called upon by the application 117 upon startup of the application 117. For example, upon startup of an application 117, the application 117 can determine whether its installation onto a particular storage volume 115 has been previously reported (e.g., via a flag that is set or written to the storage volume 115 by the application 117). If its installation has not been previously reported, the application 117 can request that the usage API 129 generate a usage report 147 and transmit the usage report to the application usage service 141.

The application usage service 141 obtains a usage report 147 generated by the usage API 129. The application usage service 141 extracts the application identifier 119 and storage volume block identifier 127 from the usage report 147 and stores data from the usage report 147 in the data store 111. The application usage service 141 can also extract other information from the usage report 147, such as an identifier associated with the machine instance 114 executing the application 117, or other metadata from the computing environment about the machine instance 114, storage volume 115, etc., that can be stored in the data store 111.

The data stored in the data store 111 includes, for example, usage data 148, where each record corresponding to usage data 148 includes a storage volume block identifier 149, application identifier 151, and potentially other data. As noted above, the application usage service 141 can store usage data 148 in response to receiving a usage report 147 corresponding to the installation of the application 117 in a machine instance 114 and storage volume 115 in the computing environment 103.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 157 and/or other applications. The client application 157 may be executed in a client 104, for example, to access network content served up by the computing environment 101 and/or other servers. The client application 157 may, for example, correspond to a browser, a mobile application, etc. The client application 157 allows a user to access usage data 148 corresponding to a particular application 117 executed within the computing environment 103. The client 104 may be configured to execute applications beyond the client application 157 such as, for example, email applications, social networking applications, and/or other applications.

Next, a general description of the operation of the various components of the networked environment 100 is provided. To begin, as noted above, an application 117 executed by a machine instance 114 in association with a storage volume 115 in the computing environment 103 can be configured to report its usage via a usage report 147 generated by the usage API 129 to the application usage service 141. In some embodiments, the application 117 can be instrumented to report its usage via the usage API 129. In other embodiments, another service executed by the machine instance 114 can monitor when a particular application 117 is installed and/or executed. The usage report 147 can be generated each time the application 117 is installed on a machine instance 114 and storage volume 115 (e.g., by an installer utility associated with the application 117), each time the application 117 is executed, periodically (e.g., every week, every month, every N executions), or in any other frequency. Accordingly, the application 117 can request that the usage API 129 generate a usage report 147 corresponding to installation and/or usage of the application 117. Such a request can include an application identifier 119 associated with the application as well as a storage volume block identifier 127 associated with the storage volume 115 in which the application 117 is installed.

The usage API 129 can incorporate the application identifier 119 and/or storage volume block identifier 127 into a usage report 147 that is transmitted to the application usage service 141. The application 117 can provide other data in its request to the usage API 129 to generate a usage report 147. For example, as noted above, an identifier associated with the machine instance 114 that uniquely identifies the machine instance 114 with respect to other machines instances 114 in the computing environment 103 can be incorporated into the request for the usage API 129 and, subsequently, into the usage report 147. As an additional example, an identifier associated with the vendor that is distinct from the application identifier 119 can also be incorporated into the usage report 147.

The usage API 129 then transmits the usage report 147 to the application usage service 141. In some embodiments, the usage API 129 can authenticate itself via a security certificate or other authentication credentials that are provided to the application maker. The application usage service 141 can then store the data extracted from the usage report 147 in the data store 111 as usage data 148. Additionally, the application usage service 141 can generate user interfaces that are transmitted to a client application 157 executed by a client 104 in which a user can view usage data relating to a particular application 117, a particular application identifier 119, a particular software vendor, or any other category by which the usage data 148 can be sorted. The application usage service 141 can also generate reporting data that is transmitted to a client 104 for viewing by a client application 157 in other forms other than a user interface that is rendered by the client application 157.

Figure 2:
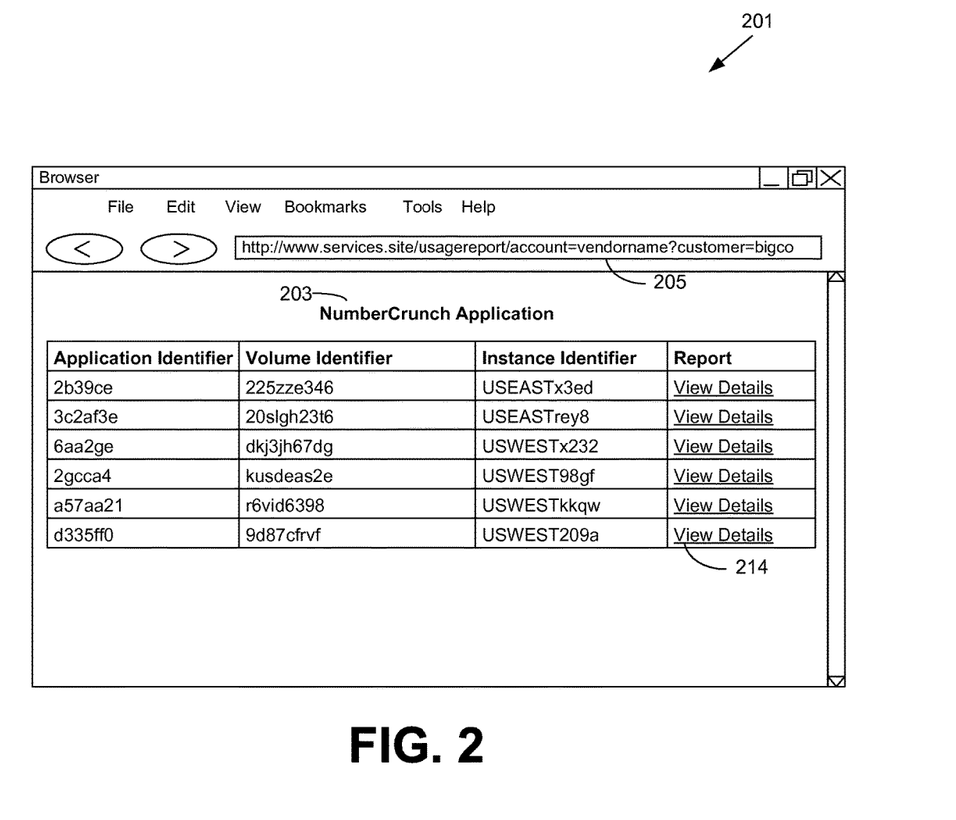
FIG. 2 is a drawing of an example of a user interface rendered by a client in the networked environment of FIG. 1 according to various embodiments of the present disclosure.
Figure 3:
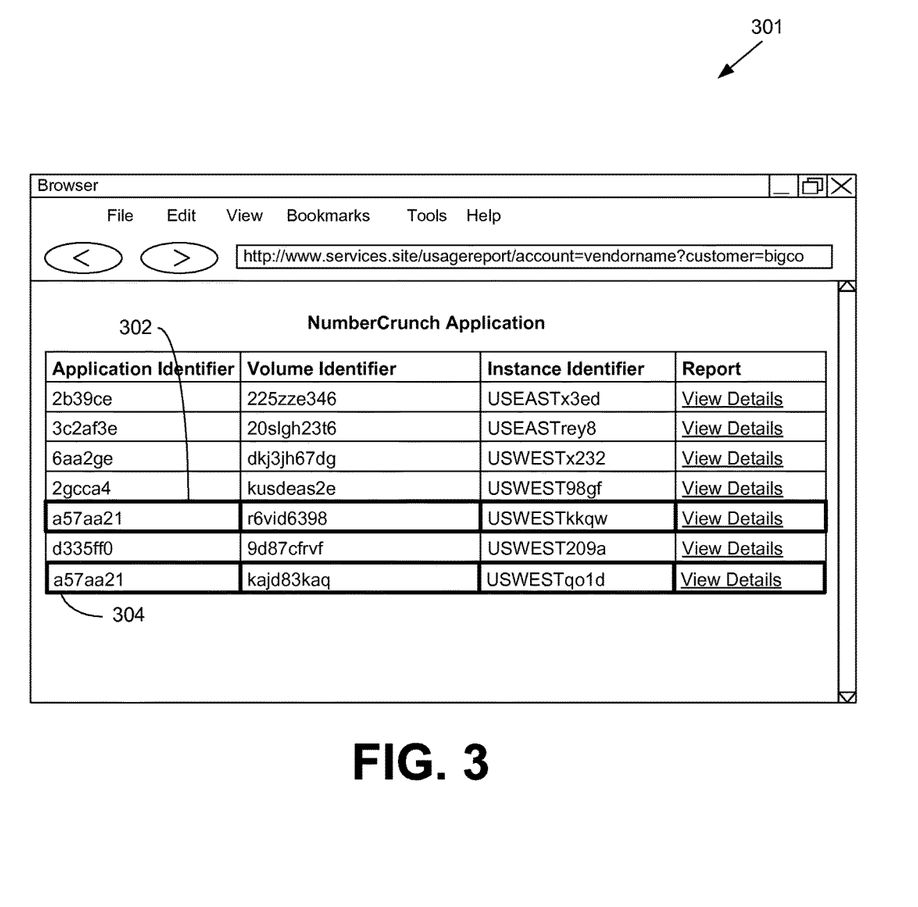
FIG. 3 is a drawing of an example of a user interface rendered by a client in the networked environment of FIG. 1 according to various embodiments of the present disclosure.

FIGS. 2-3 depict user interfaces that can be generated by the application usage service 141 and rendered by a client 104. The depicted user interfaces incorporate usage data 148 obtained from the data store 111 by the application usage service 141 from usage reports 147 associated with execution and/or installation of a particular application 117 in the computing environment 103.

FIG. 2 depicts a user interface 201 generated by the application usage service 141 and rendered on a client 104 by a client application 157. FIG. 2 may be representative of a network page served by the application usage service 141 or any other application having access to usage data 149 for rendering by a browser client application 157 executed on a client 104. In the alternative, FIG. 2 may be representative of a user interface rendered by a dedicated client application 157. In the depicted example, the user interface 201 includes usage information from the computing environment 103 that is associated with an application 203. The user interface 201, in the depicted example, is accessible with a uniform resource locator (URL) 205 that is accessed by a browser executed by the client 104. It should be appreciated that the application usage service 141 can provide usage data 148 to a client 104 in other forms and that the depicted example of a browser accessible report of usage data 148 associated with an application 117 is only one example.

Accordingly, as shown in the user interface 201 of FIG. 2, the application usage service 141 can retrieve usage data 148 for a particular application 117 that includes respective application identifiers 151, storage volume block identifiers 149 as well as any other information associated with a particular installation and/or execution of an application 117 within a machine instance 114 of the computing environment 103 that is included within a usage report 147 by the usage API 129. Additionally, the user interface 201 can allow a user to view detailed information about a particular installation and/or execution of an application 117 via a details hyperlink 214, which can provide metadata such as, for example, execution time, installation date, or any other metadata regarding usage that is included in usage reports 147 associated with an application 117.

FIG. 3 depicts an alternative example of a user interface 301 generated by the application usage service 141 and rendered on a client 104 by a client application 157. FIG. 3 may be representative of a network page served by the application usage service 141 or any other application having access to usage data 149 for rendering by a browser client application 157 executed on a client 104. In the alternative, FIG. 3 may be representative of a user interface rendered by a dedicated client application 157. In the example of FIG. 3, the usage data 148 reflects that there are multiple installations and/or executions of an application 117 having the same application identifier 117 as depicted in rows 302 and 304.

However, these multiple installations and/or executions of an application 117 are associated with differing storage volume block identifiers 127, which can, depending on a licensing arrangement, indicate that authorized installation or execution of an application 117 is occurring within the computing environment 103. Accordingly, unauthorized usage of an application 117 and/or use of an application outside the bounds of a licensing agreement can be detected by tracking usage of an application 117 with respect to an application identifier 119 associated with the installation of a product as well as an identifier associated with a storage volume 115 in a computing environment.

Figure 4:
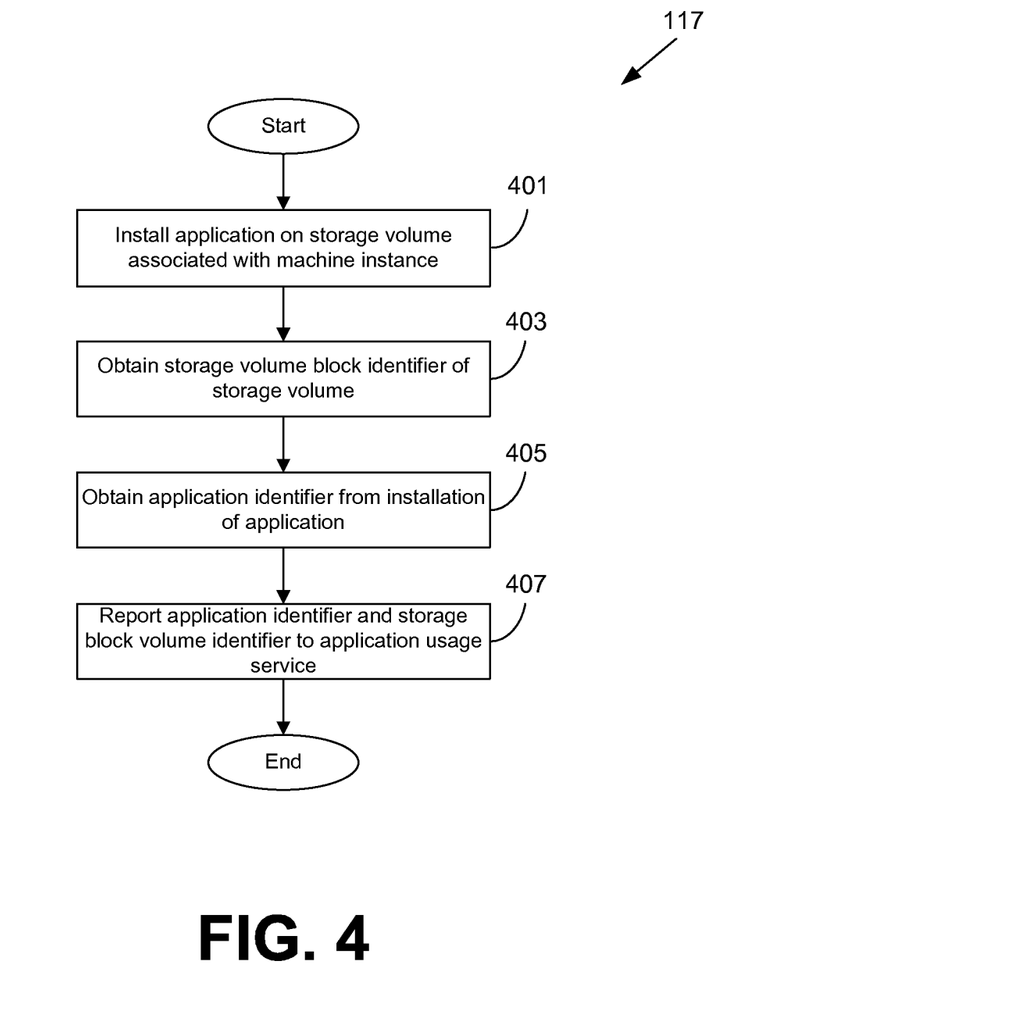
FIGS. 4-5 are flowcharts illustrating examples of functionality implemented as portions of an application executed in a computing environment in the networked environment of FIG. 1 according to various embodiments of the present disclosure.
Figure 5:
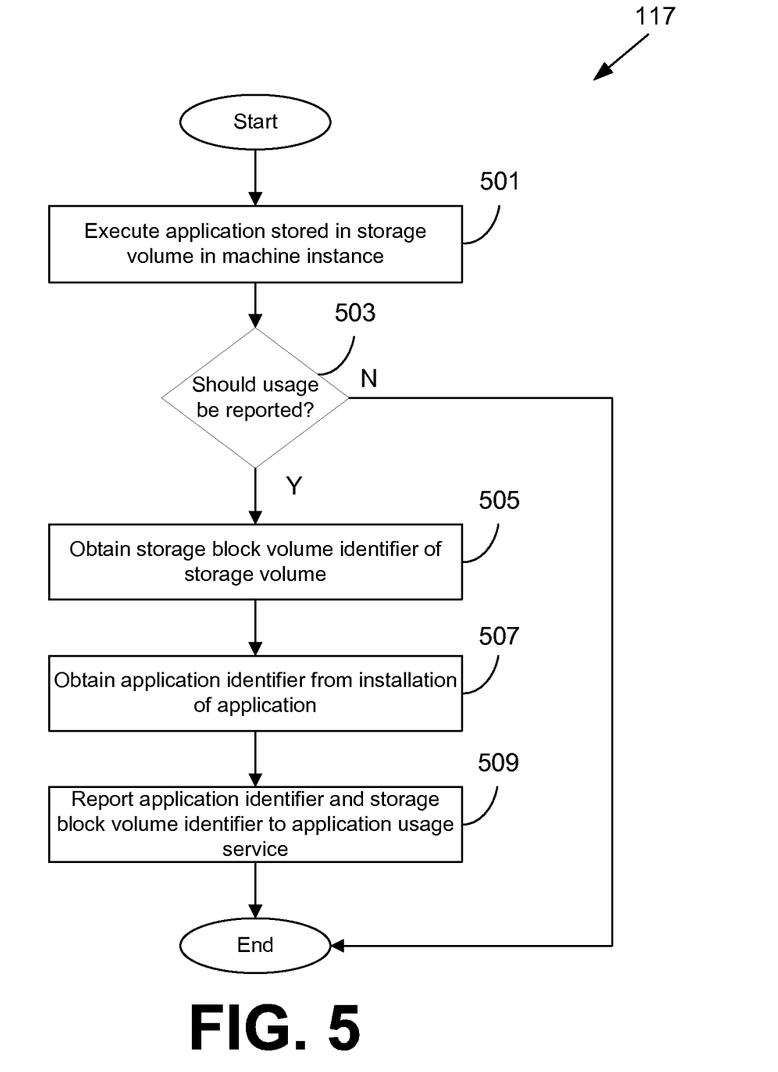

Referring next to FIGS. 4-5, shown are flowcharts that provide examples of the operation of a portion of an application 117 reporting its usage and/or installation via the usage API 129 according to various embodiments. It is understood that the flowcharts of FIGS. 4-5 provide merely an example of the many different types of functional arrangements that may be employed to implement the operation of the portion of an application 117 as described herein. As an alternative, the flowcharts of FIGS. 4-5 may be viewed as depicting an example of steps of a method implemented in the computing environment 103 (FIG. 1) according to one or more embodiments.

Beginning with box 401 of FIG. 4, the application 117, or an installer utility of the application 117, installs a copy of the application 117 on a storage volume 115 associated with a machine instance 114 that is executing the application 117. As a part of the workflow of the installer utility, the application 117 can be configured to report its installation on a particular storage volume 115 in association with a particular machine instance 114. In box 403, the application 117 obtains a storage volume block identifier 127 associated with the storage volume 115 and/or one or more of the blocks within the storage volume 115 on which the application 117 is installed. In box 405, the application 117 obtains an application identifier 119 associated with a copy of the application 119 that is being installed on the storage volume 115. In box 407, the application 117, via the usage API 129, generates a usage report 147 that reports the installation of the application to the application usage service 141.

FIG. 5 depicts an alternative example of an application 117 reporting its usage and/or installation via the usage API 129. In box 501, a copy of the application 117 stored on a storage volume 115 is executed in a machine instance 114 in the computing environment. In box 503, the application 117 determines whether its usage and/or installation has been previously reported or whether the current usage or installation is required to be reported according to a reporting schedule with which the application 117 is configured.

If not, then the portion of the application 117 that reports usage to the application usage service 141 terminates. If so, then in box 505, the application 117 obtains a storage volume block identifier 127 associated with the storage volume 115 and/or one or more of the blocks within the storage volume 115 on which the application 117 is installed. In box 507, the application 117 obtains an application identifier 119 associated with a copy of the application 119 that is being installed on the storage volume 115. In box 509, the application 119, via the usage API 129, generates a usage report 147 that reports the installation of the application to the application usage service 141. Thereafter, the portion of the application 117 ends.

Figure 6:
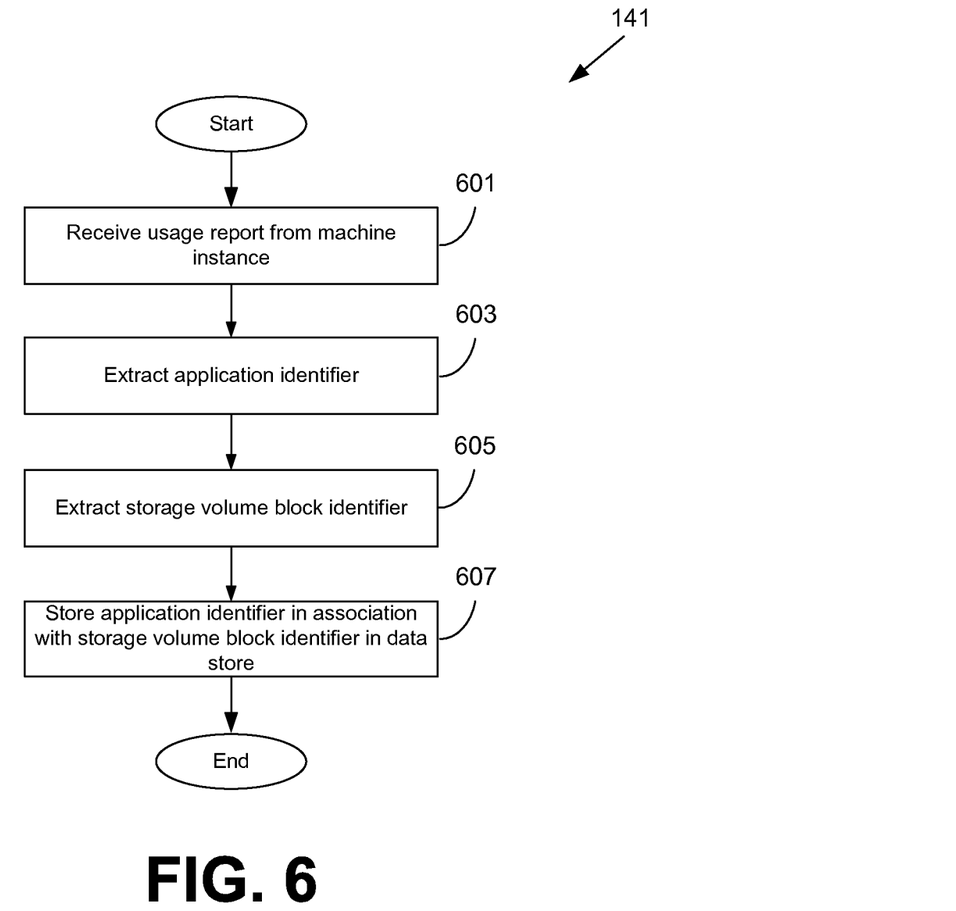
FIG. 6 is a flowchart illustrating one example of functionality implemented as portions of an application usage service executed in a computing environment in the networked environment of FIG. 1 according to various embodiments of the present disclosure.

Referring next to FIG. 6, shown is a flowchart that provides one example of the operation of a portion of an application usage service 141 according to various embodiments. It is understood that the flowchart of FIG. 6 provides merely an example of the many different types of functional arrangements that may be employed to implement the operation of the portion of the application usage service 141 as described herein. As an alternative, the flowchart of FIG. 6 may be viewed as depicting an example of steps of a method implemented in the computing environment 101 according to one or more embodiments.

Beginning with box 601, the application usage service 141 receives a usage report 147 via an application 117 and/or usage API 129 in a machine instance 114 from a computing environment 103. In box 603, the application usage service 141 extracts an application identifier 151 from the usage report 147. In box 605, the application usage service 141 extracts a storage volume block identifier 149 from the usage report. In box 607, the application usage service 141 stores the storage volume block identifier 149 and application identifier 151 as usage data 148 in the data store 111.

Figure 7:
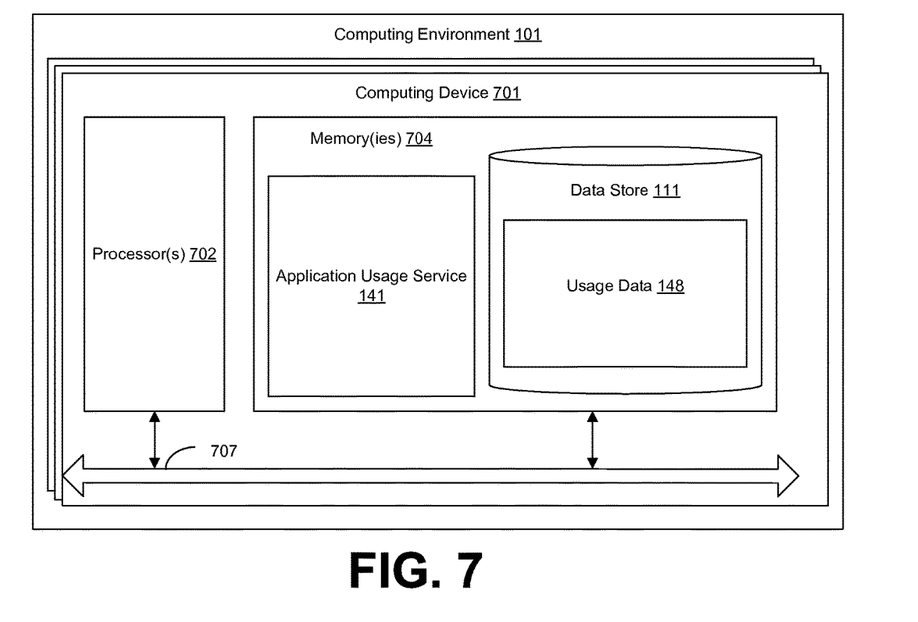
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 101 according to an embodiment of the present disclosure. The computing environment 101 includes one or more computing devices 701. Each computing device 701 includes at least one processor circuit, for example, having a processor 702 and a memory 704, both of which are coupled to a local interface 707. To this end, each computing device 701 may comprise, for example, at least one server computer or like device. The local interface 707 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are an application usage service 141, and potentially other applications. Also stored in the memory 704 may be a data store 111 storing usage data 148 and other data. In addition, an operating system may be stored in the memory 704 and executable by the processor 702.

It is understood that there may be other applications that are stored in the memory 704 and are executable by the processor 702 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 704 and are executable by the processor 702. In this respect, the term "executable" means a program file that is in a form that can ultimately be run by the processor 702. Examples of executable programs may be, for example, a compiled program that can be translated into machine code in a format that can be loaded into a random access portion of the memory 704 and run by the processor 702, source code that may be expressed in proper format such as object code that is capable of being loaded into a random access portion of the memory 704 and executed by the processor 702, or source code that may be interpreted by another executable program to generate instructions in a random access portion of the memory 704 to be executed by the processor 702, etc. An executable program may be stored in any portion or component of the memory 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 704 is defined herein as including both volatile and nonvolatile memory and data storage components. Volatile components are those that do not retain data values upon loss of power. Nonvolatile components are those that retain data upon a loss of power. Thus, the memory 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 702 may represent multiple processors 702 and/or multiple processor cores and the memory 704 may represent multiple memories 704 that operate in parallel processing circuits, respectively. In such a case, the local interface 707 may be an appropriate network that facilitates communication between any two of the multiple processors 702, between any processor 702 and any of the memories 704, or between any two of the memories 704, etc. The local interface 707 may comprise additional systems designed to coordinate this communication, including, for example, performing load balancing. The processor 702 may be of electrical or of some other available construction.

Although an application usage service 141 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of an application 117 employing the usage API 129 as well as the application usage service 141. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 702 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described Therefore, the following is claimed:

1. A non-transitory computer-readable medium storing an application executable in a computing device, wherein when executed the application causes the computing device to at least:
provide an application program interface, executable in the computing device, that defines a network service call to facilitate submission of a usage report generated by the application program interface;
determine that the application is executed or installed in a virtual machine instance in a computing environment, the virtual machine instance being associated with a storage volume in the computing environment, wherein the application is installed on the storage volume;
define an application identifier to include in the usage report, the application identifier uniquely identifying one execution or installation of the application installed on the storage volume of the virtual machine instance with respect to other executions or installations of the application;
define a storage volume block identifier to include in the usage report, the storage volume block identifier uniquely identifying the storage volume where the application is installed, with respect to other storage volumes of the virtual machine instance in the computing environment, the storage volume block identifier further being uniquely associated with a storage block with respect to other storage blocks in the storage volume;
monitor usage data corresponding to the application in the virtual machine instance to include in the usage report, the usage data comprising at least one of a time of execution or an installation date; and
submit the usage report to a client via the application program interface each time it is determined that the application is executed or installed, allowing the client to track the usage data.

2. The non-transitory computer-readable medium of claim 1, wherein when executed the application further causes the computing device to at least generate a user interface rendering a plurality of usage reports associated with the application.

3. The non-transitory computer-readable medium of claim 1, wherein when executed the application further causes the computing device to at least:
define a machine instance identifier to include in the usage report, the machine instance identifier being uniquely associated with the virtual machine instance with respect to other virtual machine instances in the computing environment; and
associate the machine instance identifier with the application identifier and the storage volume block identifier.

4. A system, comprising:
at least one computing device; and
an application usage service executable in the at least one computing device, wherein when executed the application usage service causes the at least one computing device to at least:
obtain, by the application usage service, a usage report via a network, the usage report submitted via an application program interface and indicating usage of an application, the application being installed in a virtual machine instance in a computing environment, the virtual machine instance being associated with a storage volume in the computing environment, wherein the usage report is generated in the virtual machine instance and transmitted to the application usage service via the network each time the application is installed to track the usage of the application;
extract, by the application usage service, an application identifier defined in the usage report, the application identifier uniquely identifying a copy of the application being installed in the virtual machine instance in the computing environment;
extract, by the application usage service, a storage volume identifier defined in the usage report, the storage volume identifier being associated with the storage volume, wherein the application is installed on the storage volume; and
store, by the application usage service, the application identifier in association with the storage volume identifier in a data store in communication with the at least one computing device.

5. The system of claim 4, wherein the storage volume identifier uniquely identifies the storage volume relative to other storage volumes in the computing environment.

6. The system of claim 4, wherein the storage volume identifier uniquely identifies at least one block within the storage volume.

7. The system of claim 4, wherein the storage volume identifier is stored on at least one block of storage within the storage volume.

8. The system of claim 4, wherein the usage report is received via the network from an installer utility executed by the virtual machine instance that is associated with the application.

9. The system of claim 8, wherein the installer utility is configured to install the application on the storage volume in the computing environment.

10. The system of claim 8, wherein the application is uniquely associated with a copy of the installer utility with respect to other copies of installer utilities associated with the application.

11. The system of claim 4, wherein the usage report is received via the network from a service external to the application executed by the computing environment.

12. The system of claim 4, wherein when executed the application usage service further causes the at least one computing device to at least:
extract a machine instance identifier from the usage report, the machine instance identifier being associated with the virtual machine instance; and
store the machine instance identifier in association with the application identifier and the storage volume identifier.

13. The system of claim 4, wherein when executed the application usage service further causes the at least one computing device to at least authenticate the application based at least in part upon a security certificate issued on behalf of the application usage service.

14. The system of claim 4, wherein the application identifier is associated with a software vendor, and when executed the application usage service further causes the at least one computing device to at least generate a user interface associated with the software vendor, the user interface including at least one usage report associated with the application identifier.

15. A method, comprising:
- executing, by at least one computing device, an application in a virtual machine instance in a computing environment, the application configured to utilize a storage volume in the computing environment;
- providing a software process external to the application, the software process being executed in the virtual machine instance;
- identifying, by the at least one computing device, an application identifier uniquely identifying one execution of the application in the virtual machine instance, with respect to other executions of the application, wherein the application is installed on the storage volume in the computing environment;
- identifying, by the at least one computing device, a storage volume identifier associated with the storage volume where the application is installed;
- monitoring, by the software process being executed in the virtual machine instance, usage data corresponding to the application, the usage data being based at least upon a time of execution;
- generating, by the software process being executed in the virtual machine instance, a usage report comprising the usage data, the application identifier, and the storage volume identifier; and
- transmitting the usage report over a network in response to each execution of the application.

16. The method of claim 15, further comprising transmitting the usage report to an application usage service executed by at least one other computing device via the network, wherein the application usage service is configured to store the usage report in a data store.

17. The method of claim 16, further comprising authenticating the application with the application usage service via a security certificate.

18. The method of claim 15, wherein generating the usage report is performed via an application programming interface (API) provided by a software library accessible to the at least one computing device.

19. The method of claim 15, wherein generating the usage report is performed by an installer utility associated with the application.

20. The method of claim 15, wherein the storage volume identifier uniquely identifies the storage volume relative to other storage volumes in the computing environment.

21. The method of claim 15, further comprising:
- identifying, by the software process, a machine instance identifier associated with the virtual machine instance; and
- wherein generating the usage report further comprises including the machine instance identifier within the usage report.

22. The method of claim 15, further comprising determining, by the software process, at least one of: an authorized usage of the application or an unauthorized usage of the application based on the application identifier and a license associated with a recipient of the usage report.

23. The method of claim 15, wherein the computing environment permits on-demand creation and termination of virtual machines, and transmitting the usage report in response to each execution of the application enables usage of the application to be tracked within the computing environment that permits on-demand creation and termination of virtual machines.

\* \* \* \* \*